US008552910B2

(12) United States Patent
Cornwall et al.

(10) Patent No.: US 8,552,910 B2
(45) Date of Patent: Oct. 8, 2013

(54) SYSTEM AND METHOD OF LOCATING MISSING NODES IN NETWORKS

(76) Inventors: Mark K. Cornwall, Spokane, WA (US); Nathan Cutler, Spokane Valley, WA (US); Jack D. Mitchell, Yakima, WA (US)

(*) Notice: Subject to any disclaimer, the term of this patent is extended or adjusted under 35 U.S.C. 154(b) by 48 days.

(21) Appl. No.: 13/278,434

(22) Filed: Oct. 21, 2011

(65) Prior Publication Data

US 2013/0099976 A1    Apr. 25, 2013

(51) Int. Cl.
*G01S 5/14* (2006.01)
*G01S 5/02* (2010.01)

(52) U.S. Cl.
CPC .................................. *G01S 5/0257* (2013.01)
USPC ........................................................ 342/458

(58) Field of Classification Search
CPC ................................ G01S 5/0257; G01S 5/14
USPC .................................................. 342/458, 450
See application file for complete search history.

(56) References Cited

U.S. PATENT DOCUMENTS

| | | | |
|---|---|---|---|
| 6,754,488 B1 * | 6/2004 | Won et al. ...................... | 455/424 |
| 7,116,988 B2 | 10/2006 | Dietrich et al. | |
| 7,403,762 B2 * | 7/2008 | Morgan et al. ............. | 455/404.2 |
| 7,847,707 B2 | 12/2010 | Bakken et al. | |
| 2002/0001339 A1 * | 1/2002 | Dooley et al. ................. | 375/150 |
| 2004/0233100 A1 * | 11/2004 | Dibble et al. ............ | 342/357.06 |
| 2005/0193149 A1 | 9/2005 | Boyd | |
| 2006/0022841 A1 | 2/2006 | Hoiness et al. | |
| 2006/0074601 A1 | 4/2006 | Hoiness et al. | |
| 2006/0242323 A1 | 10/2006 | Sanderford et al. | |
| 2010/0302102 A1 | 12/2010 | Desai et al. | |
| 2011/0068947 A1 | 3/2011 | Holman et al. | |

OTHER PUBLICATIONS

Office Action dated Feb. 7, 2012 for Canadian Patent Application No. 2,756,751.
PCT International Search Report for PCT International Application No. PCT/US2011/062816, search completed Feb. 17, 2012; report mailed Mar. 2, 2012.
Written Opinion of the International Searching Authority for PCT International Application No. PCT/US2011/062816, opinion completed Feb. 17, 2012; date of mailing Mar. 2, 2012.
May 30, 2012 Office Action issued in Canadian Patent Application No. 2,756,751.

* cited by examiner

*Primary Examiner* — Gregory C Issing
(74) *Attorney, Agent, or Firm* — Lee & Hayes, PLLC (57) ABSTRACT

Systems and methods of locating missing endpoints in a utility meter network include periodically receiving electronic GPS data including coordinates identifying the physical location of a mobile meter reading device and collecting radio frequency (RF) data transmissions sent by one or more missing endpoints in proximity to the mobile meter reading device. Energy levels associated with the RF data transmissions can be used to determine a signal strength indicator for each transmission. The transmissions are collected while the mobile meter reading device is positioned in at least first and second different locations relative to each missing endpoint. A triangulation procedure is electronically implemented using the GPS coordinates and the signal strength indicator for a given missing endpoint as determined in the at least first and second different locations in order to identify an estimated location for the given missing endpoint, which is provided as electronic output to a user.

26 Claims, 6 Drawing Sheets

SYSTEM AND METHOD OF LOCATING MISSING NODES IN NETWORKS

FIELD OF THE SUBJECT MATTER

The presently disclosed subject matter generally relates to networks. More particularly, the presently disclosed technology relates to systems and methods for utilizing a data collection system to locate missing nodes in a network, and for example particularly such as endpoints in a utility meter network.

BACKGROUND OF THE SUBJECT MATTER

A typical utility provider (e.g., gas utility, water utility, electrical utility, etc.) is often responsible for managing multiple meters that provide information about utility usage by its customers. Sometimes, these meters become lost within a networked utility system, resulting in missing endpoints corresponding to the utility meters. The endpoints may become missing for a variety of reasons. Sometimes the utility company has inadvertently lost the location of where the endpoint is installed. Other times, an endpoint is maliciously removed by a customer to avoid getting billed for consumption. In some instances, customers take a meter from one house and place it on another to avoid getting billed.

Utilities often have trouble locating these missing endpoints. In some current systems, missing endpoints generally can be identified using the radio frequency (RF) communications modules available within Automatic Meter Reading (AMR) collection networks. For example, various AMR systems utilize hand-held readers and programming devices, vehicle-mounted readers, fixed location readers, and/or combinations thereof to automatically gather consumption data and otherwise communicate with the meter endpoints in a utility network.

Some conventional AMR systems may include communications systems that utilize one-way endpoint devices that periodically transmit their consumption and related information as a "bubble-up" event. This type of transmission is known as a one-way system because the endpoint sends only outbound communications and does not receive any commands or acknowledgements from the reader. One-way systems are designed such that endpoint devices transmit their messages from once every several seconds to once per minute. Other known AMR systems utilize 1.5-way or two-way endpoint devices. One-and-one-half-way and two-way endpoints operate in a listen mode for most of the time. Reads are accomplished by interrogating specific endpoint devices by the reader. In a 1.5-way system, an endpoint responds to a wakeup tone from a reader by transmitting its consumption and related information. In a two-way system, endpoint devices are responsive to various additional commands from the reader that may specify what type of information an endpoint should transmit.

In conventional AMR systems, the communications system of a data collector, e.g., a data collection unit within a mobile reader, receives an endpoint identifier when data from a specific endpoint is read by the collector. The collector may also receive a timestamp for each endpoint when it is first read by a mobile reader. From the endpoint identifier and the timestamp, a utility can retroactively determine what the approximate area the mobile reader was in at the time of reading the missing endpoint. Since some endpoints can be read from as much as one mile away, it makes the search area quite large. As such, an RF communications tool that can help utility customers to better pinpoint the location of missing endpoints is desired.

U.S. Patent Application Publication No. 2011/0068947 (Holman et al.) pertains to mobile meter reading for locating stolen utility meters. In such reference, a method, collection device, and automatic meter reading (AMR) system uses a set of identifiers, such as transponder serial numbers, to build a route of utility meters that have been reported as having been stolen. When each mobile collection device's daily routes are prepared, the route of stolen utility meters is added to the other routes for which the mobile collection device is ordinarily tasked with collecting meter read data. As the mobile collection device traverses its daily routes, it collects meter read data for the stolen utility meters along with the meter read data for its other routes. The route of stolen utility meters is unloaded from the mobile collection device along with the other daily routes when the read process is finished. The route of stolen utility meters may contain information that may assist the utility company in locating the stolen utility meters.

U.S. Pat. No. 7,847,707 (Bakken et al.) discloses a method and system for collecting meter readings in wireless transmissions from unlisted customers. In such patent, an out-of-route collection capability is provided for an AMR data collection system of a type that collects readings within a geographic area using a radio. If a transmission is received from an out-of-route transmitter, its location is based on a geographic location of the data collector as the data collector receives data from the out-of-route transmitter. The location can further be determined by evaluating a received signal strength indicator (RSSI) for the transmission. The out-of-route transmitter is identified by association with a transmitter identification number. The out-of-route transmitters can be added to the route through operations at the central office.

The complete disclosures of the herein referenced publications are fully incorporated herein for all purposes.

SUMMARY OF THE SUBJECT MATTER

In view of the recognized features encountered in the prior art and addressed by the presently disclosed subject matter, improved systems and methods for utilizing a data collection system to locate missing endpoints in a utility meter network are presently provided.

In one exemplary embodiment, a method of locating missing endpoints or nodes in a network (for example, such as but not limited to a utility meter network) includes periodically receiving electronic GPS data including GPS coordinates identifying the physical location of a mobile communication device (for example, a mobile meter reading device) including one or more radios and corresponding antennas. Radio frequency (RF) data transmissions sent by one or more missing nodes/endpoints in proximity to the mobile communication device are also collected. The RF data transmissions include at least an endpoint/node identifier used to identify whether an endpoint/node in proximity to the mobile communication device is a missing endpoint/node. The transmissions are received by the one or more radios and are collected while the mobile communication device is positioned in at least first and second different locations relative to each of the one or more missing nodes/endpoints. A signal strength indicator is determined for some or all of the collected RF data transmissions, including those identified as being sent by missing nodes/endpoints. A triangulation procedure is electronically implemented using the electronic GPS coordinates and the signal strength indicators for a given missing node/endpoint as determined in the at least first and second different locations in order to identify an estimated location for the given missing node/endpoint, which is provided as electronic output to a user.

In other more particular embodiments, the step of electronically implementing a triangulation procedure utilizes a weighted average of the GPS coordinates associated with different transmission collection locations such that transmission collection locations indicating a higher signal strength received from the missing endpoint are weighted more heavily than transmission collection locations having a lower signal strength received from the missing endpoint. The triangulation procedure can be implemented in real time or post processing after data is obtained during a given meter reading route. Estimated locations can be provided in the form of a pinpoint set of latitude and longitude coordinates or in the form of an area more broadly representing an estimated area location. The point location and/or the area location can be provided as data output and/or as graphical icons on a map-based display. A confidence value may also be determined for the estimated location and provided as electronic output to a user.

In addition to various methodologies, the presently disclosed subject matter equally relates to associated systems, including various software, firmware or hardware components that may be provided in a data collection unit or other processing module. One exemplary such system may include a GPS module, one or more radios, each radio comprising a receiver and an antenna, at least one memory module and a processor. The at least one memory module can be configured to store GPS coordinates periodically received from the GPS module and radio log files of data transmission collection information periodically collected from the one or more radios. The one or more radios determine a signal strength indicator for some or all of the collected RF data transmissions, including those identified as being sent by missing endpoints. The signal strength indicator is also saved as part of the radio log files. The processor is coupled to the data collection unit and is configured to execute code in the form of an endpoint (or node) locating application. The endpoint locating application is configured to access the GPS coordinates and radio log files stored in the at least one memory module. The endpoint locating application is further configured to electronically implement a triangulation procedure using the GPS coordinates and selected information from the RF data transmissions for a given missing endpoint as determined in at least first and second different locations. The endpoint locating application then identifies an estimated location for the given missing endpoint and provides the estimated location for the given missing endpoint as electronic output to a user.

Another exemplary embodiment concerns one or more computer-readable media storing computer-executable instructions that, when executed by one or more processors, cause the one or more processors to perform various acts. Such acts may include periodically receiving electronic GPS data including electronic GPS coordinates identifying the physical location of a mobile meter reading device or mobile communication device, said mobile meter reading or communication device comprising one or more radios, each radio having a respective receiver and corresponding antenna. The acts may further include collecting radio frequency (RF) data transmissions sent by one or more missing endpoints/nodes in proximity to the mobile meter reading or communication device, wherein each said RF data transmission comprises at least an endpoint/node identifier used to identify whether an endpoint/node in proximity to the mobile meter reading or communication device is a missing endpoint/node. In addition, the acts include determining a signal strength indicator from selected ones of the collected RF data transmissions, including those identified as being sent by missing endpoints/nodes. The RF data transmissions are received by the one or more radios and are collected while the mobile meter reading or communication device is positioned in at least first and second different locations relative to each said one or more missing endpoints/nodes. A triangulation procedure is electronically implemented using the electronic GPS coordinates and the signal strength indicators for a given missing endpoint/node as determined in said at least first and second different locations in order to identify an estimated location for the given missing endpoint/node, which is then provided as electronic output to a user.

Although the presently disclosed material has application in Smart Grid and AMI networks and meshed networks, the concepts are equally applicable in more general communication networks which can benefit in a similar fashion as disclosed. In a utility industry setting, the nodes may include endpoints, meters, cellular relays, routers, transformers, substations, servers and head offices, for example. While techniques are described herein in the context of a utility network, the techniques are also applicable to other types of networks as well, such as, for example, telecommunications networks, sensor networks, and the like. In the context of other networks, nodes may include servers, computers, routers, switches, sensors, or any other device coupled to any type of network.

Additional advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments of the presently disclosed subject matter may include various combinations or configurations of presently disclosed features, steps, or elements, or their equivalents including combinations of features, parts, or steps or configurations thereof not expressly shown in the figures or stated in the detailed description of such figures. Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps of the presently disclosed subject matter.

DETAILED DESCRIPTION OF THE SUBJECT MATTER

As discussed in the Summary section, the presently disclosed subject matter is particularly concerned with the provision of improved methodology and corresponding systems for utilizing a data collection system to locate missing endpoints in a utility system.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

A data collection system for implementing aspects of the disclosed technology most often includes components and features of an automated meter reading (AMR) system. AMR technology may be available in a variety of different types, including but not limited to handheld readers, vehicle-mounted readers, fixed location readers, and/or combinations thereof. Although certain embodiments of the disclosed technology will describe a data collection unit associated with a vehicle-mounted mobile meter reader and related system components, it should be appreciated that the disclosed technology is not necessarily limited to vehicle-mounted AMR technology. Handheld readers or other mobile readers may also be used, or combinations of fixed location readers may also be utilized as long as information is available from at least first and second different locations as further described herein.

Figure 1:
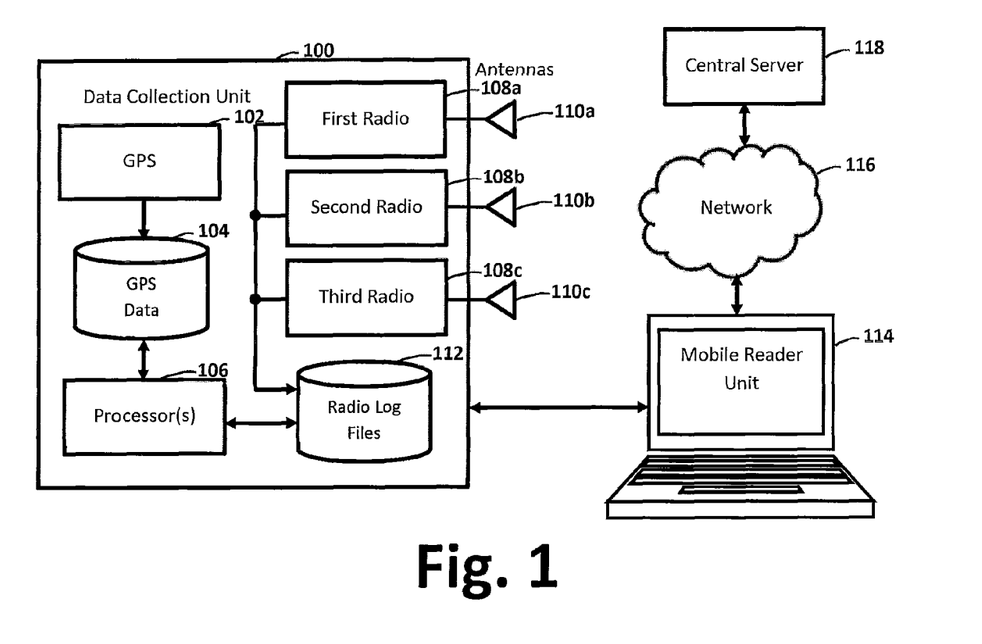
FIG. 1 is a schematic illustration of exemplary components within an automated meter reading (AMR) system in accordance with embodiments of the disclosed technology.

Referring now to FIG. 1, an exemplary data collection unit 100 may generally include a GPS device 102, one or more processors 106, and one or more radios 108. In general, each radio will include at least a receiver and an antenna 110, whether only one radio or multiple radios are included in data collection unit 100. Although FIG. 1 illustrates a specific example of three radios, including first radio 108a and corresponding antenna 110a, second radio 108b and corresponding antenna 110b, and third radio 108c and corresponding antenna 110c, it should be appreciated that the disclosed technology can utilize any combinations of features within the one or more radios.

In one specific non-limiting example, data collection unit 100 includes at least one radio that utilizes a side-looking antenna and at least one radio that utilizes an omni-directional antenna. In another non-limiting example, data collection unit 100 includes three radios as shown in FIG. 1, where two of the radios utilize side-looking antennas and one of the radios utilizes an omni-directional antenna. In another non-limiting example, data collection unit 100 includes at least one radio utilizing a manually adjustable antenna. In such examples, the omni-directional antenna may be an integrated roof-mounted antenna, while the side-looking antennas are configured for reception on the left and/or right sides of a mobile meter reader vehicle in order to better account for possible locations of transmissions received from various utility endpoints.

Referring still to FIG. 1, selected transmission information received from the one or more radios 108 in data collection unit 100 ultimately may be stored in database 112, referred to herein as radio log files. Radio log files 112 may include a variety of particular information associated with the transmissions received by the one or more radios 108 from endpoints in geographical proximity to the radios 108. In some examples, radio log files include such information as an endpoint identifier from each endpoint it receives a communication. In other examples, one or more characteristics indicating energy level of the RF transmissions can be used by the receiver to calculate the signal strength of each received endpoint transmission (e.g., the Received Signal Strength Indicator, or RSSI). Additional information included in radio log files may include the channel number or other channel identifier on which the transmission was received and a timestamp associated with each RF transmission received. Radio log files also may include a receiver identifier indicating which radio receiver included within the mobile meter reading device received each data transmission. One or more of these data variables stored in the radio log files database 112 ultimately may be used in determining estimated locations for missing endpoints in a utility meter network.

Referring still further to FIG. 1, an additional GPS database 104 may store selected information received from the GPS module 102, which periodically receives satellite communications indicating various specific parameters about the current location and movement of the mobile meter reading device. For example, select data received by GPS module 102 and ultimately stored in GPS database 104 may include but are not limited to the current latitude and longitude coordinates of the GPS module, the speed and/or bearing of the vehicle, person or other mechanism housing the mobile data collection unit 100, and also an optional accuracy indicator that provides an estimated value for the accuracy of each GPS reading. Although GPS database 104 and radio log file database 112 are illustrated in FIG. 1 as separate modules, this is only an exemplary illustration. It should be appreciated that such data may be stored in a variety of fashions, including together in a single database or distributed across multiple databases. Databases 104 and 112 may be stored in memory comprising any suitable form of computer readable medium. Such memory device(s) may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other computer-readable storage medium which can be used to store the desired information and which can be accessed by a computing device.

Once information is received in the data collection unit 100, it may be accessed by a separate computer or processor that is linked either locally or remotely to the data collection unit. In one example, data collection unit 100 is communicatively coupled to mobile reader unit 114. The data collection unit may be further coupled either directly or indirectly through mobile reader unit 114 to a central server 118 or other remote data location through network 116. Mobile reader unit 114 may correspond to a variety of electronic devices such as but not limited to a desktop computer, a laptop computer, a netbook computer, a palmtop computer, a tablet computer, a handheld computer, a mobile computing device, a mobile phone, a cellular phone, a VoIP phone, a smart phone, a personal digital assistant (PDA), a media player, a navigation device, an e-mail device, a game console or other portable electronic device, a combination of any two or more of the above or other electronic devices, or any other suitable component adapted with the features and functionality disclosed herein. Network 116 may correspond to any combination of one or more wired and/or wireless links that provide access to such networks as a dial-in network, a local area network (LAN), wide area network (WAN), public switched telephone network (PSTN), the Internet, intranet or ethernet type networks or others.

A local computer such as mobile reader unit 114 or a remote computer coupled to server 118 is configured to access selected data from data collection unit 100 and analyze such data using a dedicated software program in the form of an endpoint locating application 200. Execution of endpoint locating application 200 can happen on mobile reader unit 114 and/or a remote computer in real time or as a post-processing application after data has been gathered. Various additional features within and steps implemented as part of endpoint locating application 200 are discussed with reference to FIGS. 2, 4 and others.

Endpoint locating application 200 corresponds to software instructions rendered in a non-transitory computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the methods and systems set forth and disclosed herein may also be implemented by hard-wired logic or other circuitry, including, but not limited to application-specific circuits. Of course, various combinations of computer-executed software and hard-wired logic or other circuitry may be suitable, as well.

Figure 2:
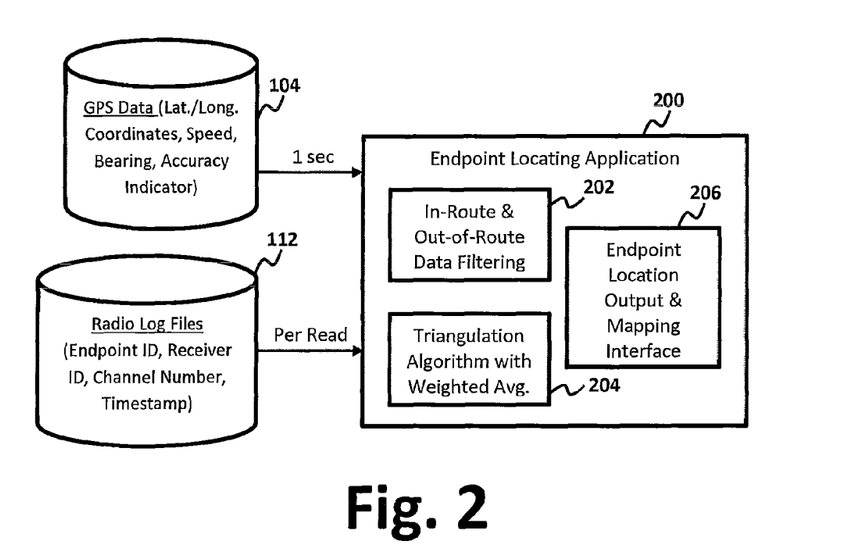
FIG. 2 is a block diagram of exemplary components within a data collection unit in a mobile reader as part of an AMR system in accordance with the disclosed technology.

Referring now to FIG. 2, a simplified schematic diagram is provided that shows selected data from GPS database 102 and radio log file database 112 provided to the endpoint locating application 200. The endpoint locating application 200 ultimately may include a plurality of different software modules for accomplishing various steps and objectives as disclosed herein. For example, endpoint locating application 200 may include an in-route and out-of-route data filtering module 202, a triangulation algorithm module 204 and an endpoint location output and mapping interface module 206. Exemplary modules 202-206, respectively, may be broken down into multiple software sub-modules or additional particular modules than those shown in FIG. 2 may also be provided.

Figure 3:
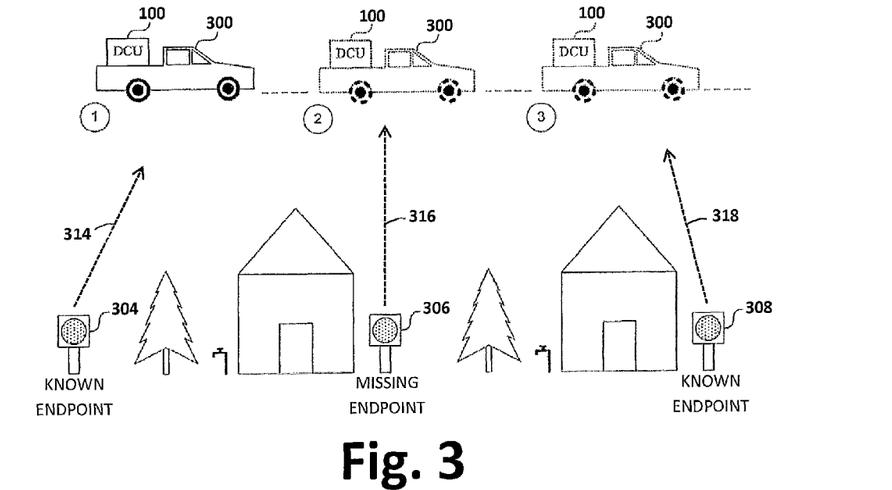
FIG. 3 is an exemplary schematic overview of component interaction between an AMR system and endpoints in a particular vicinity.

Referring now to FIG. 3, a graphical example is shown to depict the manner in which data is received by the components of a data collection unit from various endpoints in a utility meter network. Assume that data collection unit 100 is used as a mobile meter reader apparatus included in a vehicle 300. As that vehicle 300 travels along a planned or unplanned route, it will be positioned at a plurality of different locations (e.g., a first location (1), a second location (2) and a third location (3).) While the vehicle 300 is traveling from the first location to the second location to the third location and so on, endpoints in the geographical proximity to the DCU 100 may be configured to transmit signals. Endpoint transmissions may be triggered as "wake up" events where the endpoint transmits in response to an interrogation or inquiry from the DCU radio, as "bubble up" events where the endpoints actively transmit in some periodic fashion, or in response to some other predetermined arrangement or triggered communication event.

Referring still to FIG. 3, three different endpoints are illustrated for exemplary purposes. In the example, a first endpoint 304 is known and selectively outputs a transmission signal 314, a second endpoint 306 is unknown or missing and selectively outputs a transmission signal 316, and a third endpoint 308 is known and selectively outputs a transmission signal 318. Each transmission signal typically includes an endpoint identifier so that each transmission signal can be associated with its corresponding endpoint. DCU 100 knows which endpoints are "known" ahead of time because the DCU 100 normally has access to a list of particular endpoints that it is tasked to read on a particular route. If a transmission is received from an endpoint that is not on the route, then it may be dynamically identified as a "missing" endpoint. Alternatively, the missing endpoints also may be known ahead of time in the form of a list of endpoint identifiers, and the DCU 100 knows to look out for those missing endpoints by comparing endpoint identifiers from received RF data transmissions with the stored list of missing endpoints while gathering in-route or out-of-route data transmissions. One of more aspects of the above-described endpoint characterization may be accomplished by the in-route and out-of-route data filtering module 202 of FIG. 2. Data filtering module 202 may also filter or select a subset of endpoints for further analysis in accordance with the disclosed techniques. For example, data filtering module 202 may be used to select data transmissions corresponding only to missing endpoints.

In order to accomplish the disclosed steps related to implementing a triangulation procedure, it is desirable for DCU 100 to obtain signal transmissions 316 from each missing endpoint 306 while the vehicle 300 and DCU 100 are in at least first and second different geographical locations. In some embodiments, multiple transmissions from each missing endpoint (e.g., 306) are desirable in order to obtain even more data for use in the missing endpoint locating application. For example, the estimation algorithms may benefit from implementing weighted averaging from multiple endpoint transmissions, such as on a range of 2-20 transmissions.

Figure 4:
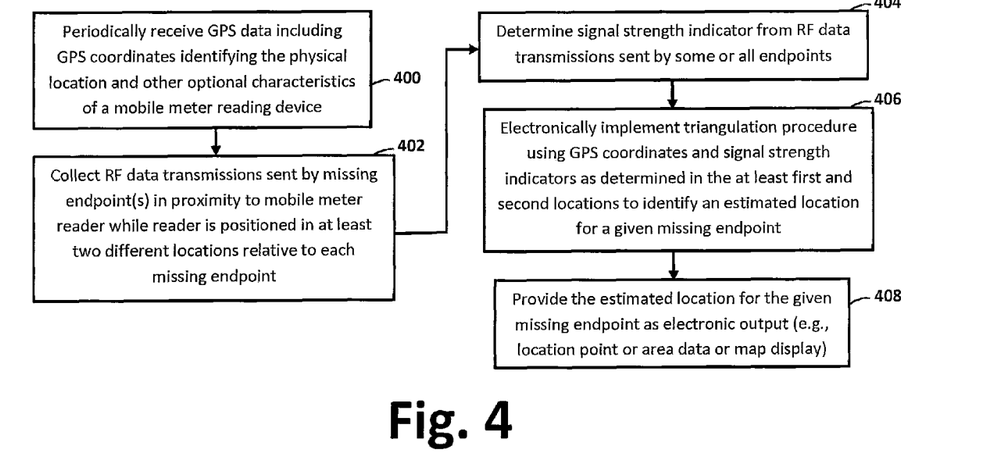
FIG. 4 is a flow chart of exemplary steps in a method of identifying missing endpoints in a utility network in accordance with aspects of the disclosed technology.

Referring now to FIG. 4, exemplary steps are disclosed that may be selectively implemented in various embodiments of the disclosed method of locating missing endpoints in a utility network. In a first step 400, GPS data is periodically received from a GPS module associated with a mobile meter reader's data collection unit 100. In one embodiment, the electronic GPS data received in step 400 may include electronic GPS coordinates or similar such parameters identifying the physical location of the mobile meter reader (e.g., latitude and longitude coordinates). In other embodiments, the GPS data received in step 400 also may include optional characteristics such as but not limited to vehicle speed and/or bearing, and other characteristics of a mobile meter reading device. The GPS data is received periodically, and might be received as often as every second or some portion thereof, or in increments that are several seconds apart.

In step 402, RF data transmissions are received from each missing endpoint in local proximity to data collection unit 100. The transmissions received from various endpoints will vary as the mobile meter reader transitions from one place to another along a planned or dynamically created route. In one example, it is preferred that transmissions are received for each missing endpoint while the mobile meter reader is in at least first and second different locations relative to each missing endpoint. In another example, transmissions are received for each missing endpoint in more than just two different locations. The RF data transmissions collected in step 402 may include such information as an endpoint identifier. As previously described, the endpoint identifiers can be used by the in-route and out-of-route data filtering module 202 to identify subsets of RF data transmissions for which subsequent analysis is desired. RF data transmissions are recorded at a data collection unit 100 when a nearby endpoint transmits to the DCU radios, or when selected endpoints transmit to such radios.

In some embodiments, received GPS data can be correlated in time with collected RF data transmissions for missing endpoints. In one example, the received GPS data can be integrated in a collective data string with radio log files recorded for collected RF data transmissions with the data (including GPS and RF transmission data) listed sequentially in the order that it occurs. In this way, any items logged in a radio log file can be matched with either the previous or next GPS entry and the system can ensure that a GPS reading correlated to each RF data transmission is accurate within one second since GPS coordinates are typically logged at least once every second. In another example, radio log files corresponding to the RF data transmissions can be matched with or correlated to GPS data based on the timestamps at which both respective sets of data are received by DCU 100.

Referring now to step 404, energy levels associated with the RF data transmissions collected in step 402 can be used by one or more radio receivers to calculate a signal strength indicator (e.g., RSSI or other signal level parameter) for selected ones of the RF data transmissions. In some embodiments, the signal strength indicator calculations are made for all collected RF data transmissions. In other embodiments, the signal strength indicator calculations are made for only some of the collected RF data transmissions. Either way, the RSSI values or other signal strength indicators are preferably calculated for all RF data transmissions identified as being sent by missing endpoints. These signal strength indicators can be determined at the radio level (for example in the form of a signal strength voltage), and the endpoint locating application 200 can then convert the signal strength voltage to a power level in dBm (the power ratio in decibels (dB) of the measured power referenced to one milliwatt (mW)). The signal strength indicators can be stored as part of the radio log files or as a separate parameter in memory associated with data collection unit 100.

Once the desired GPS data and radio log files are received per steps 400 and 402 and signal strength indicators are determined in step 404, a triangulation procedure is electronically implemented to process such data in step 406. In general, step 406 is implemented as part of the triangulation algorithm module 204 illustrated in FIG. 2. More particularly, step 406 involves implementing the triangulation procedure, which generally determines the estimated location of a missing endpoint by approximating the latitude and longitude of a missing endpoint based off latitudes and longitudes of the correlated GPS data at which RF data transmissions for the missing endpoints are received by the mobile meter reading device's data collection unit 100. With the receiver location being known at the time the endpoints are heard, multiple receiving locations can be plotted. In a rough estimate of the location of the endpoint, latitudes and longitudes can be averaged together. The result is an average location of the endpoint. This method uses one transmitter and multiple receiver locations to do the location finding. When real-time applications are implemented, the averaging effected as part of the triangulation procedure can be done as a sliding averaging as each new transmission from a missing endpoint is received, as opposed to weighted averaging which may be more effective during post-processing after all transmissions are received in some embodiments.

In other embodiments, various additional parameters can be used in the triangulation procedure so that the procedure embodied at step 406 involves more than simple averaging of GPS data points. Instead, triangulation may use a weighted average taking into account various parameters obtained in steps 400 and 402 and calculated in step 404. In some embodiments, the RSSI and GPS location can be used to generate a missing endpoint location estimation. By using weighted averaging where receiver locations with stronger RSSI values are given more weight than locations with weak RSSI values, the endpoint location is shifted towards the points where the RSSI is stronger. Using a weighted average produces a more accurate estimation of the endpoint location. This weighted averaging technique can be compared with a simple averaging technique where a receiver drives around an endpoint, as in around the block where the endpoint is located, and a simple average would put the endpoint in the middle of the block when actually it is not precisely in the middle.

Referring still to step 406, additional exemplary parameters can also be used in the weighted averaging process. For example, vehicle bearing and/or speed can be used with side-looking antennas to determine the direction that the vehicle is traveling and indirectly the direction in which the endpoint is estimated to be. In addition, the side-looking antennas could be used to adjust the estimated location to the right or left of a vehicle. This can be done by utilizing the receiver identifiers associated with the various RF data transmissions to account for whether a data transmission is received by an antenna on the right or left side of the vehicle and adjusting the estimated locations accordingly. Speed can also be used in weighting algorithms to account for the signal strength or power level of the RF transmissions received by the radios 108. In some examples, speed of the vehicle can be dynamically adjusted in order to get more reads near a missing endpoint at higher power levels. Still further, each GPS data reading may include an accuracy indicator that provides an estimate for how accurate the GPS reading is. In the triangulation procedure, this accuracy indicator could be used as a factor in weighting the average of multiple readings in a direction where GPS levels are more certain. In addition, the accuracy indicator can be used to help calculate a confidence value for an estimated location as later discussed herein.

Referring now to step 408, once an estimated location for each missing endpoint is calculated in accordance with step 406, the estimated location can then be provided as electronic output to a user. Step 408 may be implemented within the endpoint location output and mapping interface module 206 illustrated in FIG. 2. In some examples, the estimated location can be provided as data output on a display screen or as a graphical icon on an electronic mapping interface. The estimated location and corresponding visual display could be in a variety of different forms, such as but not limited to a pinpoint location of estimated coordinates represented by a point icon, "x" symbol or the like, or an area location represented by a larger area such as outlined by a circle or ellipse. In other examples, visual electronic output may be coupled with audible output, for example in the form of an alarm that indicates that a mobile meter reader is close to a missing endpoint. This audio output could thus signal the meter reader in some form so that vehicle speed might be reduced to obtain more readings at higher power and confidence levels.

Referring still to a method of locating missing endpoints in a utility meter network, another optional exemplary step (not illustrated in FIG. 4) may include calculating a confidence value for the estimated location determined in step 406. In reality, there is a radius around the estimated point where the endpoint likely resides. It is possible to estimate the level of certainty that a missing endpoint lies within a certain radius of that location. A circle representing the area location can be placed graphically around an icon representing the point location. A confidence value can then be determined to establish the likelihood that the endpoint is within that circle. In general, a confidence value will be higher when the circle area location around an estimate is smaller. In addition to calculating the confidence value, the estimated area location shown visually on a map or other graphical interface could be adjusted based on the confidence value. For example, assume that a circle with a predetermined size radius is used to represent the area around each estimated point location. If a lower confidence value is calculated for that estimate, the radius of the circle could be increased. If a higher confidence value is calculated for that estimate, the radius of the circle could be decreased. The confidence value calculated in this exemplary step can be determined in part from one or more parameters, such as but not limited to the accuracy indicator associated with a received GPS reading and/or the RSSI or other signal strength indicator associated with received RF data transmissions.

Figure 5:
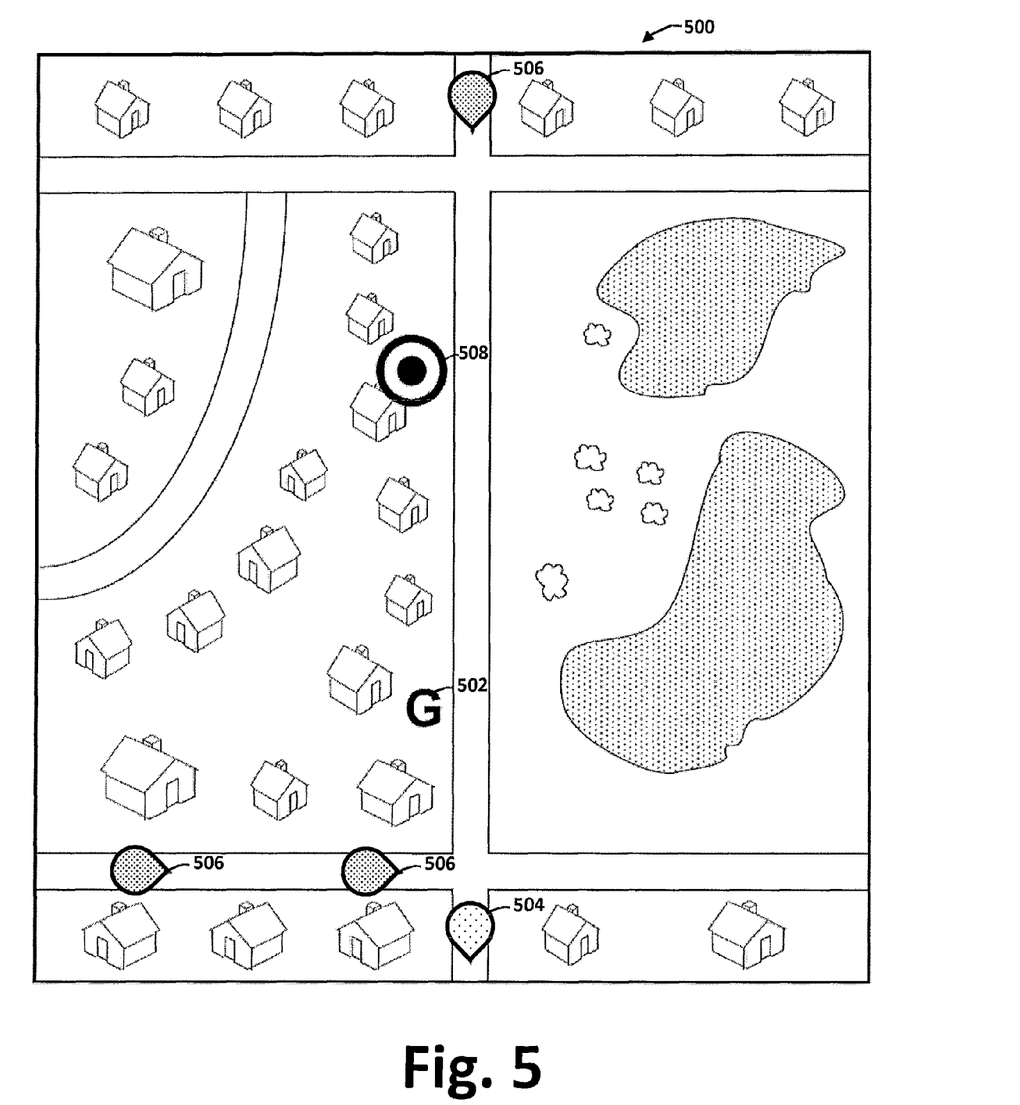
FIG. 5 is an exemplary map-based display that may be generated as output in accordance with a first particular method of identifying missing endpoints in a utility network, such method including non-weighted averaging.
Figure 6:
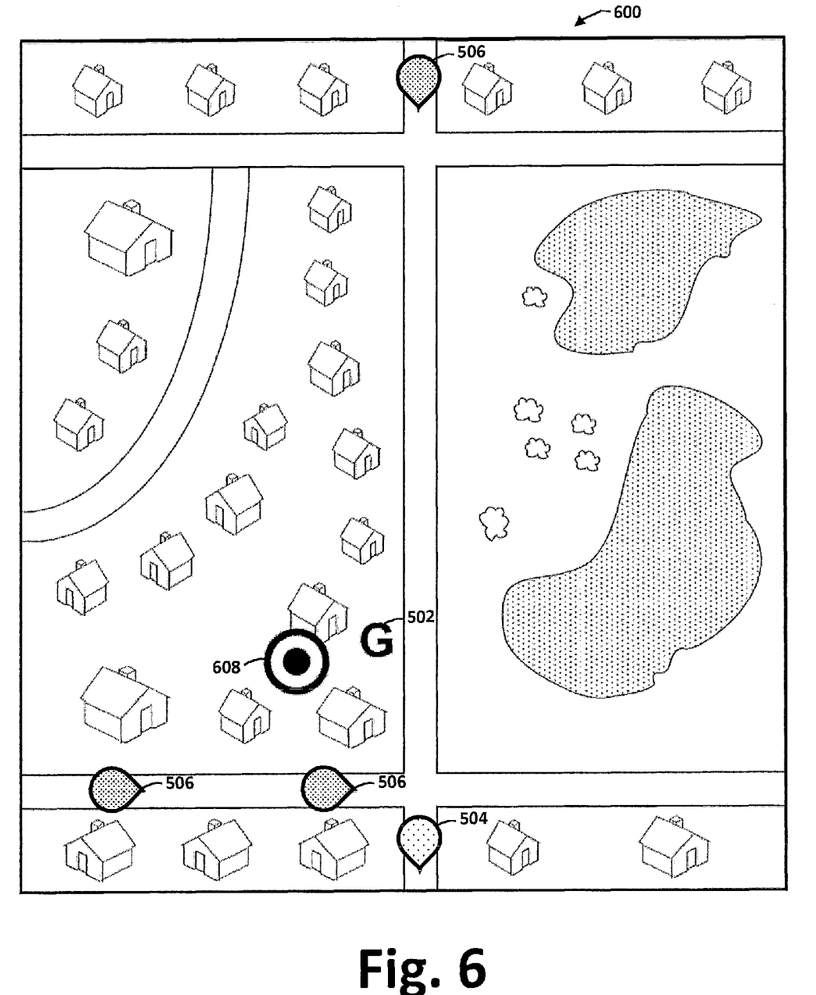
FIG. 6 is an exemplary map-based display that may be generated as output in accordance with a second particular method of identifying missing endpoints in a utility network, such method including weighted averaging.
Figure 7:
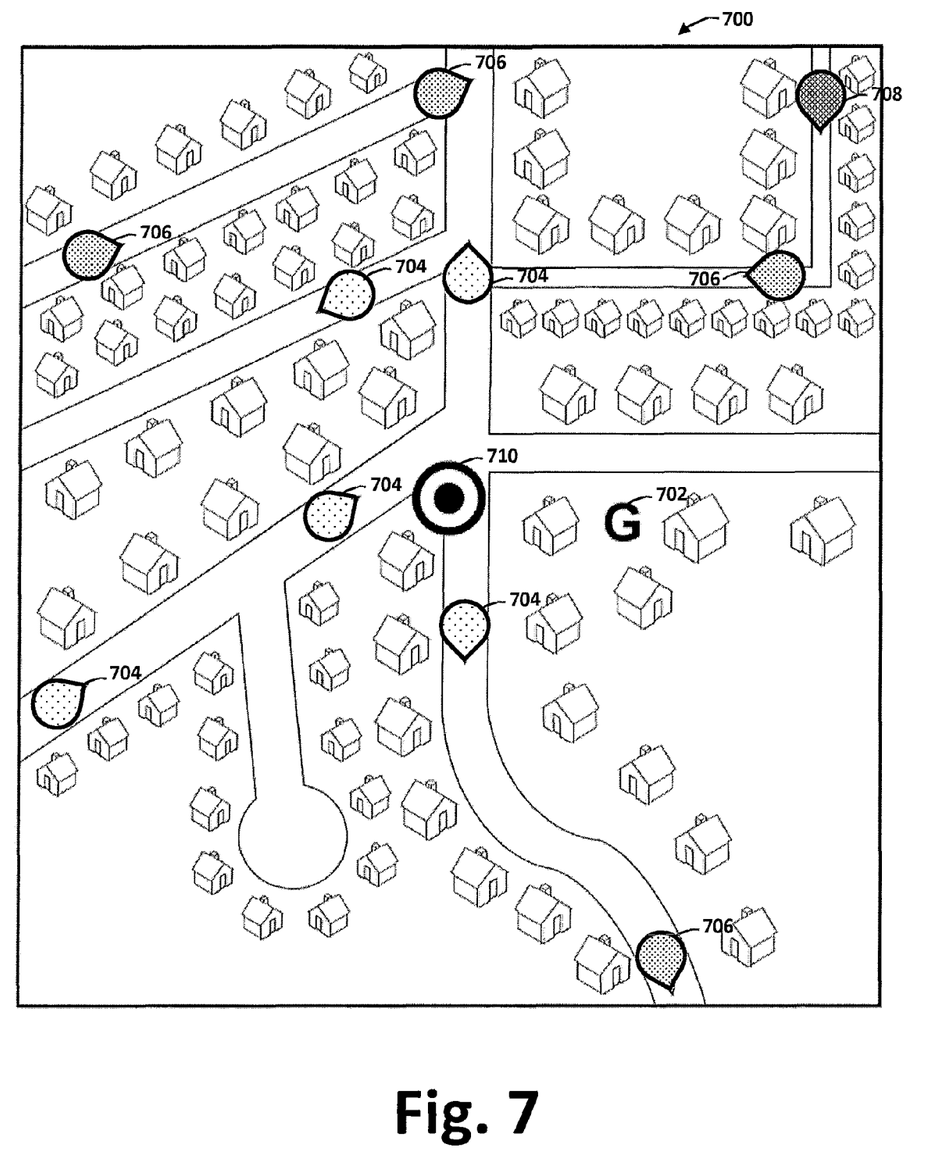
FIG. 7 is an exemplary map-based display that may be generated as output in accordance with a third particular method of identifying missing endpoints in a utility network, such method including no side-looking antenna radio offset.
Figure 8:
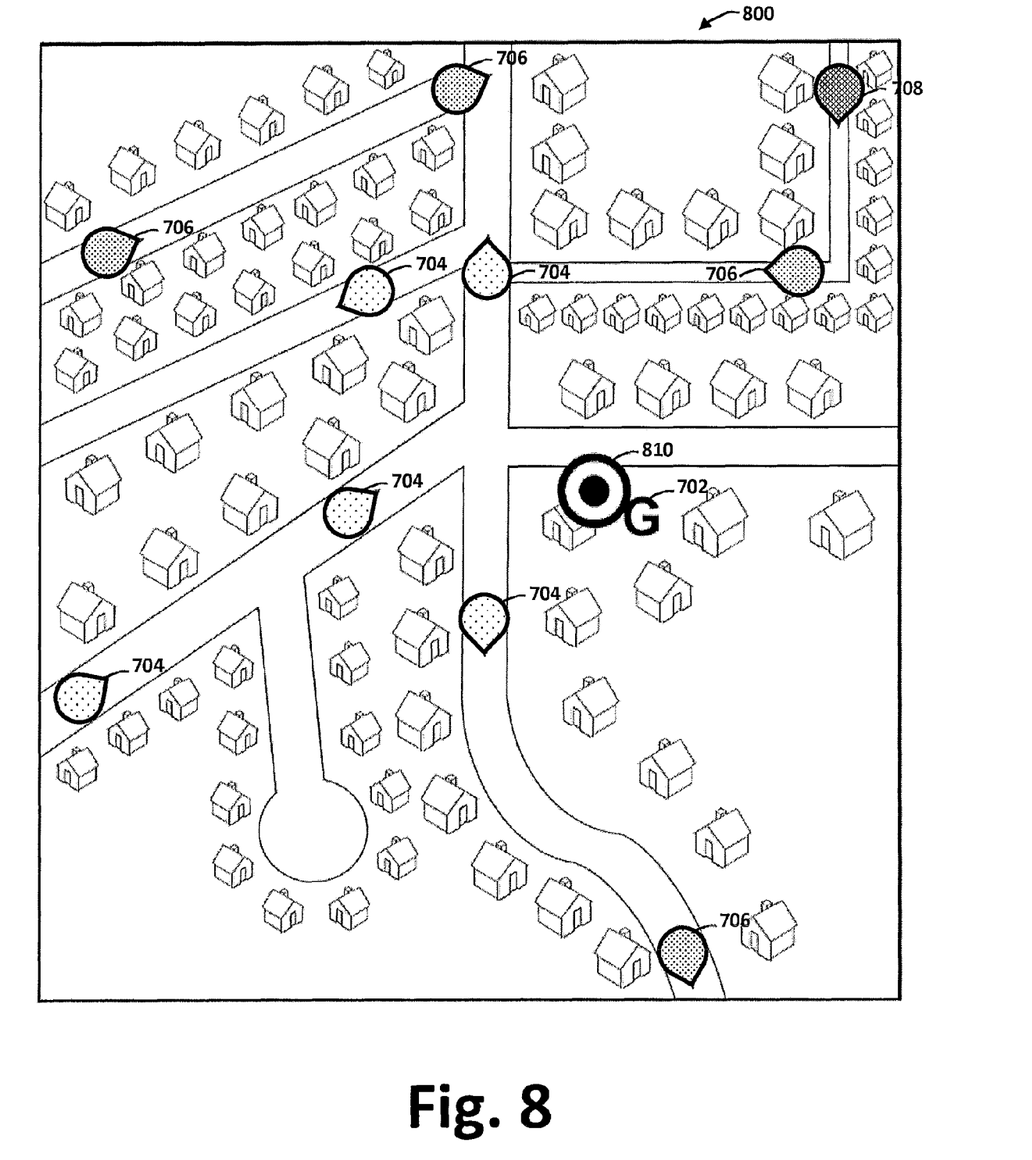
FIG. 8 is an exemplary map-based display that may be generated as output in accordance with a fourth particular method of identifying missing endpoints in a utility network, such method including side-looking antenna radio offset.

Referring now to FIGS. 5-8, various map-based displays are provided that show first, second, third and fourth examples of graphical output that may be generated as part of the disclosed method of locating missing endpoints in a utility network. FIG. 5 shows a display generated using non-weighted averaging, FIG. 6 shows a display generated using weighted averaging, FIG. 7 shows a display generated using no side-looking antenna radio offset, and FIG. 8 shows a display generated using side-looking antenna radio offset. In each figure, teardrop icons represent the vehicle location when each radio transmission was received by a mobile meter reader's data collection unit. The point of each teardrop icon represents the bearing of the vehicle. Teardrop icon color (represented by different levels of pixelated shading in FIGS. 5-8) indicates the strength of the received signal, and can change on a color gradient to represent stronger to weaker signals. In FIGS. 5-8, lighter shading/color icons represent higher power and darker shading/color icons represent lower power. Although only two or three different shading/power combinations are illustrated in FIGS. 5-8, it should be appreciated that a fewer or greater number of shading/power combinations are available for representation in various forms of electronic output. The "G" icon in each map-based display indicates the actual location of a missing endpoint transmitter, while the target-shaped icon represents the location of the estimated coordinates.

Referring now to FIGS. 5 and 6, first and second respective examples of electronic output are provided in the context of respective electronic mapping interfaces 500 and 600. The "G" icon 502 in both FIGS. 5 and 6 corresponds to the same actual location of a missing endpoint transmitter. A first set of data transmission locations illustrated with a first level of shading/power (light shading, high power) is represented in FIGS. 5 and 6 as teardrop icons 504. A second set of data transmissions illustrated with a second level of shading/power (medium shading, medium power) is represented in FIGS. 5 and 6 as teardrop icons 506. Based on the GPS locations and the signal strength indicators for the collection of received data transmissions (including those represented by the first set of icons 504 and second set of icons 506), FIG. 5 illustrates target-shaped icon 508 indicating the estimated coordinates for the location of missing endpoint 502 based on a triangulation procedure using non-weighted averaging. FIG. 6 illustrates target-shaped icon 608 indicating the estimated coordinates for the location of missing endpoint 502 based on a triangulation procedure using weighted averaging. For this example, the triangulation procedure using weighted averaging as in FIG. 6 results in a more accurate endpoint location estimate than that using non-weighted averaging as in FIG. 5.

Referring now to FIGS. 7 and 8, third and fourth respective examples of electronic output are provided in the context of respective electronic mapping interfaces 700 and 800. The "G" icon 702 in both FIGS. 7 and 8 corresponds to the same actual location of a missing endpoint transmitter. A first set of data transmission locations illustrated with a first level of shading/power (light shading, high power) is represented in FIGS. 7 and 8 as teardrop icons 704. A second set of data transmissions illustrated with a second level of shading/power (medium shading, medium power) is represented in FIGS. 7 and 8 as teardrop icons 706. A third set of data transmissions illustrated with a third level of shading/power (dark shading, low power) is represented in FIGS. 7 and 8 as teardrop icons 708. Based on the GPS locations and the signal strength indicators for the collection of received data transmissions (including those represented by the first set of icons 704, second set of icons 706 and third set of icons 708), FIG. 7 illustrates target-shaped icon 710 indicating the estimated coordinates for the location of missing endpoint 702 based on a triangulation procedure using weighted averaging and no side-looking antenna radio offset. FIG. 8 illustrates target-shaped icon 810 indicating the estimated coordinates for the location of missing endpoint 702 based on a triangulation procedure using weighted averaging and side-looking antenna radio offset. For this example, the triangulation procedure of FIG. 8 using weighted averaging and side-looking antenna radio offset results in a more accurate endpoint location estimate than that of FIG. 7 not including side-looking antenna radio offset.

While the presently disclosed subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the presently disclosed subject matter as would be readily apparent to one of ordinary skill in the art.

What is claimed:

1. A method of locating missing nodes in a network, comprising the steps of:
periodically receiving electronic GPS data including electronic GPS coordinates identifying the physical location of a mobile communication device, said mobile communication device comprising one or more radios, each radio having a respective receiver and corresponding antenna;
collecting radio frequency (RF) data transmissions sent by one or more missing nodes in proximity to the mobile communication device, wherein each said RF data transmission comprises at least a node identifier used to identify whether a node in proximity to the mobile communication device is a missing node;
determining a signal strength indicator from selected ones of the collected RF data transmissions, including those identified as being sent by missing nodes;
wherein said RF data transmissions are received by the one or more radios and are collected while the mobile communication device is positioned in at least first and second different locations relative to each said one or more missing nodes;
electronically implementing a triangulation procedure using the electronic GPS coordinates and the signal strength indicators for a given missing node as determined in said at least first and second different locations in order to identify an estimated location for the given missing node; and
providing the estimated location for the given missing node as electronic output to a user;
wherein said step of electronically implementing a triangulation procedure utilizes a weighted average of the GPS coordinates associated with different transmission collection locations such that transmission collection locations indicating a higher signal strength received from the missing node are weighted more heavily than transmission collection locations having a lower signal strength received from the missing node.

2. The method of claim 1, wherein the network comprises a utility meter network, the mobile communication device comprises a mobile meter reading device, the nodes comprise endpoints, and the node identifiers comprise endpoint identifiers.

3. The method of claim 2, further comprising a step of correlating GPS data in time with each collected RF data transmission for a missing endpoint.

4. The method of claim 2, wherein said signal strength identifier determined for selected ones of the collected RF data transmissions comprises a Received Signal Strength Indicator (RSSI) measuring the power in each received RF data transmission.

5. The method of claim 2, wherein said one or more radios comprise at least one radio comprising a side-looking antenna and at least one radio comprising an omni-directional antenna.

6. The method of claim 2, wherein said one or more radios comprise three radios, two radios comprising side-looking antennas and one radio comprising an omni-directional antenna.

7. The method of claim 2, wherein said step of electronically implementing a triangulation procedure is implemented in real time as GPS coordinates and RF data transmissions are collected by the radios in the mobile meter reading device.

8. The method of claim 2, wherein said step of electronically implementing a triangulation procedure is implemented post processing after data is obtained during a given meter reading route.

9. The method of claim 2, further comprising a step of extracting in-route meter data from out-of-route meter data to assist with determining which data is received from a missing endpoint as opposed to other known endpoints in the utility meter network.

10. The method of claim 2, wherein said step of providing the estimated location for the given missing endpoint as electronic output to a user comprises providing estimated latitude and longitude coordinates of the estimated location.

11. The method of claim 2, wherein said step of providing the estimated location for the given missing endpoint as electronic output to a user comprises displaying the estimated location as a graphical icon on an electronic mapping interface.

12. The method of claim 11, further comprising a step of calculating a confidence value for the estimated location and providing the confidence value as electronic output to a user.

13. A mobile data reading system, comprising:
a data collection unit, comprising:
a GPS module;
one or more radios, each radio comprising a receiver and an antenna; and
at least one memory module configured to store GPS coordinates periodically received from said GPS module and radio log files of data transmission collection information periodically collected from said one or more radios, wherein said radio log files comprise at least a node identifier associated with each data transmission collection and a signal strength indicator determined by the one or more radios; and
a processor coupled to said data collection unit, said processor configured to execute code in the form of a node locating application, said node locating application configured to access the GPS coordinates and radio log files stored in said at least one memory module, electronically implement a triangulation procedure using the GPS coordinates and the signal strength indicator for a given missing node as determined in at least first and second different locations in order to identify an estimated location for the given missing node, and provide the estimated location for the given missing node as electronic output to a user;
wherein the triangulation procedure implemented by said processor utilizes a weighted average of the GPS coordinates associated with different transmission collection locations such that transmission collection locations indicating a higher signal strength received from the missing node are weighted more heavily than transmission collection locations having a lower signal strength received from the missing node.

14. A mobile data reading system as in claim 13, wherein the mobile data reading system comprises a mobile meter reading system, the node identifier comprises an endpoint identifier, and the node locating application comprises an endpoint locating application.

15. A mobile meter reading system as in claim 14, wherein the data transmission collection information received by said one or more radios is collected while the mobile meter reading system is in a plurality of different locations, and wherein at least the signal strength indicator determined for each such data transmission collection is used in determining the estimated location for the given missing endpoint.

16. A mobile meter reading system as in claim 14, wherein said one or more radios comprise at least one radio comprising a side-looking antenna and at least one radio comprising an omni-directional antenna.

17. A mobile meter reading system as in claim 14, wherein said one or more radios comprise three radios, two radios comprising side-looking antennas and one radio comprising an omni-directional antenna.

18. A mobile meter reading system as in claim 14, wherein said one or more radios comprises at least one radio comprising a manually adjustable antenna.

19. A mobile meter reading system as in claim 14, further comprising an electronic display coupled to said processor, said display configured to show the estimated location of the missing endpoint as a graphical icon on an electronic mapping interface.

20. A mobile meter reading system as in claim 19, wherein said processor is further configured to calculate a confidence value for the estimated location and adjust the graphical icon on the electronic mapping interface based on the calculated confidence value.

21. One or more computer-readable media storing computer-executable instructions that, when executed by one or more processors, cause the one or more processors to perform acts comprising:
   periodically receiving electronic GPS data including electronic GPS coordinates identifying the physical location of a mobile communication device, said mobile communication device comprising one or more radios, each radio having a respective receiver and corresponding antenna;
   collecting radio frequency (RF) data transmissions sent by one or more missing nodes in proximity to the mobile communication device, wherein each said RF data transmission comprises at least a node identifier used to identify whether a node in proximity to the mobile communication device is a missing node;
   determining a signal strength indicator from selected ones of the collected RF data transmissions, including those identified as being sent by missing nodes;
   wherein said RF data transmissions are received by the one or more radios and are collected while the mobile communication device is positioned in at least first and second different locations relative to each said one or more missing nodes;
   electronically implementing a triangulation procedure using the electronic GPS coordinates and the signal strength indicators for a given missing node as determined in said at least first and second different locations in order to identify an estimated location for the given missing node; and
   providing the estimated location for the given missing node as electronic output to a user;
   wherein said act of electronically implementing a triangulation procedure utilizes a weighted average of the GPS coordinates associated with different transmission collection locations such that transmission collection locations indicating a higher signal strength received from the missing node are weighted more heavily than transmission collection locations having a lower signal strength received from the missing node.

22. The computer-readable media of claim 21, wherein the mobile communication device comprises a mobile meter reading device, the nodes comprise endpoints, and the node identifiers comprise endpoint identifiers.

23. The computer-readable media of claim 22, wherein the one or more processors are further configured to extract in-route meter data from out-of-route meter data to assist with determining which data is received from a missing endpoint as opposed to other known endpoints in the utility meter network.

24. The computer-readable media of claim 22, wherein said act of providing the estimated location for the given missing endpoint as electronic output to a user comprises providing estimated latitude and longitude coordinates of the estimated location.

25. The computer-readable media of claim 22, wherein said act of providing the estimated location for the given missing endpoint as electronic output to a user comprises displaying the estimated location as a graphical icon on an electronic mapping interface.

26. The computer-readable media of claim 22, wherein the one or more processors are further configured to calculate a confidence value for the estimated location and providing the confidence value as electronic output to a user.

* * * * *